United States Patent [19]

Mantelle et al.

[11] 4,373,750
[45] Feb. 15, 1983

[54] JOINT FOR PIPE INTENDED FOR PETROLEUM INDUSTRY

[75] Inventors: Jean Mantelle, Aulnoye Aymeries; Georges Trouillet, Aulnoye, both of France

[73] Assignee: Societe Anonyme dite: Vallourec, Paris, France

[21] Appl. No.: 201,472

[22] Filed: Oct. 28, 1980

[30] Foreign Application Priority Data

Oct. 30, 1979 [FR] France .............. 79 26890

[51] Int. Cl.³ .............................................. F16L 9/14
[52] U.S. Cl. ........................................ 285/55; 285/334; 285/351; 285/369; 285/382.4
[58] Field of Search ........... 285/333, 334, 355, 390, 285/417, 334.4, 369, 382.4, 55, 351; 403/343

[56] References Cited

U.S. PATENT DOCUMENTS

| | | | |
|---|---|---|---|
| 2,239,942 | 4/1941 | Stone et al. | 285/334 X |
| 2,258,066 | 10/1941 | Oyen | 285/334.4 X |
| 2,450,453 | 10/1948 | Boehm | 285/334 X |
| 2,467,413 | 9/1969 | Modrelle | 285/334.4 X |
| 2,574,081 | 11/1951 | Abeyg | 285/334 X |
| 3,489,437 | 1/1970 | Duret | 285/334 X |
| 3,870,351 | 3/1975 | Motsuki | 285/334 |
| 4,262,941 | 4/1981 | Lalikos et al. | 285/334.4 |

*Primary Examiner*—Dave W. Arola
*Attorney, Agent, or Firm*—Arnold, White & Durkee

[57] ABSTRACT

A joint for pipes in which externally threaded male members are screwed into an internally threaded sleeve. The ends of the male members have sealing surfaces thereon and are substantially cylindrical and thread-free. The ends are so formed that upon abutment they will be urged radially outwardly. The threaded sleeve has a substantially thread-free cylindrical sealing surface intermediate its ends. When the male members are screwed into the sleeve the ends abut causing the sealing surfaces of the male members to be forced radially outwardly into tighter sealing engagement with the sealing surface of the sleeve.

11 Claims, 10 Drawing Figures

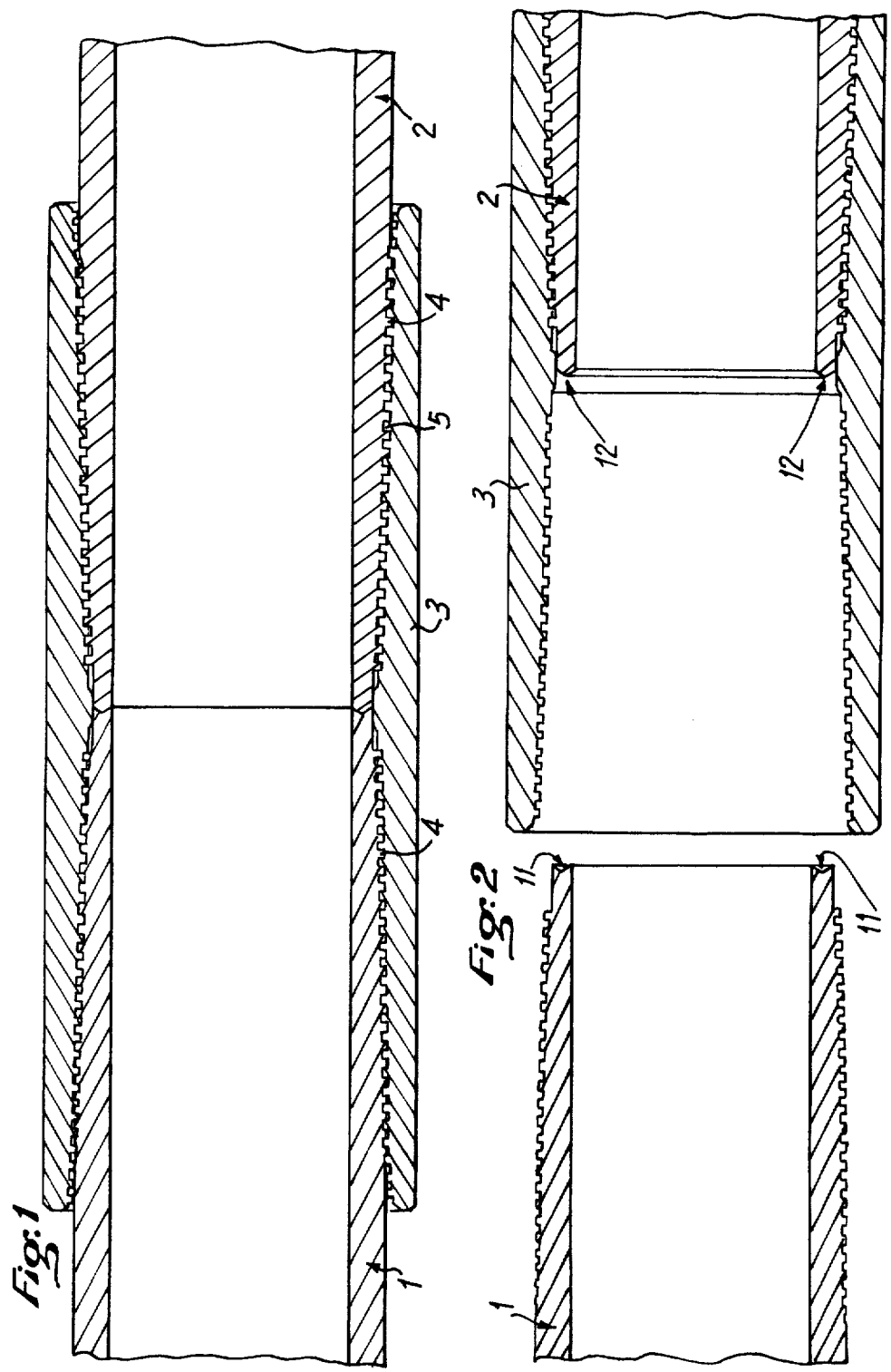

JOINT FOR PIPE INTENDED FOR PETROLEUM INDUSTRY

FIELD OF THE INVENTION

This invention relates to a joint for pipe, more particularly for steel pipe intended in particular for the petroleum industry, particularly for casing and production strings.

BACKGROUND OF THE INVENTION

Joints of this type should exhibit a certain number of qualities that are hard to reconcile in practice.

The joints should be able to support very great pressures between the inside wall and outside wall of the pipe string. They should also exhibit a mechanical resistance comparable to that of the pipe elements they are to join.

Considering that the pipe string equipped with these joints is intended to be place in deep boreholes, it is desirable that the diameter of the joint exceed the pipe diameter by the smallest possible value.

These joints must also exhibit a reliable fluid tightness, even after repeated screwings and unscrewings, a given male end being able to be mounted on this occasion on different female ends, despite fabrication tolerances that are inherent in all industrial production.

It is also desirable that the joint to the greatest extent possible assure self-repair of fluid-tight surfaces, because these latter are relatively often subjected to deteriorations during on-site handling.

The joint according to the invention is of the type wherein the ends of two males elements are joined by a female sleeve, each male element being provided with a truncated conical threading that engages in a corresponding female threading made in the sleeve.

SUMMARY OF THE INVENTION

This invention has for its object a joint for pipe, particularly steel pipe, intended more particularly for exploitation of petroleum deposits, of the type wherein the ends, provided with a threading, for example, a conical threading, of two male ends are joined by a sleeve exhibiting a corresponding threading on each side, characterized by the fact that the sleeve exhibits in its central part a substantially cylindrical fluid-tight surface whose axis corresponds to the axis of the joint, each male element having at the periphery of its end a corresponding substantially cylindrical fluid-tight surface whose diameter is equal or slightly greater than the diameter of the fluid-tight surface of the sleeve, the ends of the male elements coming to rest axially against one another during tightening of the joint and the space between the ends of the male elements at the time of this first contact increasing from the periphery to the center of the joint, so that during tightening of the joint ends of the male elements are pushed outward to reinforce the fluid tightness by increasing the pressure of the fluid-tight surfaces of the male elements and the sleeve.

According to the invention, a contact pressure is created on the outside periphery of the ends of the male elements that first come in contact at the time of tightening the joint. Any further tightening tends, on the one hand, to crush the peripheral front surfaces of the ends of the male elements against one another and, on the other hand, to force these ends outward, thus increasing said contact pressure.

It can therefore be seen, according to the invention, that in a plane passing through the axis of the joint, at the point where the outside generatrices of the fluid-tight surfaces of the male elements join, there is, at the time of first contact, half the space that is occupied by the female sleeve whose fluid-tight surface is cylindrical, while the other half of the space is occupied only partially by the end of the male elements because, according to the invention, the distance that separates the ends of the male elements is zero at the point of outside contact to take on values than increase toward the outside of the joint.

Under these conditions, it can be seen that when tightening of the joint is continued, there is caused a partial filling of the residual space between the ends of the male elements by forcing them outward, which increases their pressure on the fluid-tight surface of the sleeve by a sort of knuckle joint effect.

To this knuckle joint effect is further added the diametral swelling effect of the male elements, localized in the contact pressure zone, which occurs when a contraction is exerted in the axial direction. This effect gives an additional contact force in the radial direction which is added to the initial binding or which can even absorb a slight initial play.

According to the invention, the front surfaces of the ends of the male elements can have various shapes.

The ends of the male elements can, for example, be very slightly concave conical, i.e., the end of each male element can be delimited by a conical surface whose angle with the axis of the joint is slightly less than 90°, the summits of the cones being directed toward the inside of the male elements.

In this way the biconical space between the ends of the male elements at the time of first contact of the male elements is progressively reduced during tightening by crushing of the periphery of the ends of the male elements.

In another preferred embodiment of the invention, the surfaces of the ends of the male elements have a biconical shape, the peripheral zone of the ends of the male elements having a conicity directed in the direction opposite to the conicity of the inside zone.

The concities of the peripheral zones of the ends of the two male elements intended to be mounted in the same sleeve are such that the first contact between the ends of the male elements is made at the periphery of these latter. The ends of the male elements are then progressively crushed during tightening in the vicinity of the first point of contact until the conical surface of the same conicity, which are on the inside zone of the ends of the male elements, come to rest against one another to form a stop.

According to the invention, it is preferable that the cylindrical fluid-tight surface of the sleeve be extended in the direction of the threads by a surface whose diameter is progressively enlarged to permit an easy engagement and automatic centering of the end of the male element whose fluid-tight surfaces have a diameter equal to or greater than the diameter of the fluid-tight cylindrical surface of the sleeve.

For this purpose, it is also preferable to round off slightly the outside edge of the end of each male element.

The size of the rounding off, however, can be very slight and correspond only to a slight beveling of the sharp edge of the end of the male elements.

In a variant of the invention, two fluid-tight O rings, for example, of PTFE, can be placed in circular grooves made on the cylindrical fluid-tight surface of the sleeve on both sides of the point where the ends of the male elements come in contact.

According to the invention it is also possible to place a PTFE ring in a groove made in the vicinity of the inside end of at least one of the male elements.

The joint according to the invention offers the advantage of being an easy and economic embodiment.

First, there is no screwing limitation stop on the sleeve which for that reason can be machined from a thinner type.

The fluid-tight surfaces, both on the sleeve and on the ends of the male elements, are cylindrical surfaces whose machining is particularly easy and economical. Further, fabrication controls are much easier to perform and can be done with calipers whose cost is lower than those of calipers generally used for quality control of joints for the petroleum industry.

In the case of pipe strings intended to contain corrosive liquids on their inside, it.is possible to make only the male elements of stainless steel, the sleeves being made of regular steel.

Also thanks to the joint according to the invention, it is possible to join bimetal pipes whose part in the vicinity of the inside surface is, for example, made of stainless steel, while the rest of the pipe is made of regular steel. In this case, it is also preferable to make the front ends of the male elements with a coating of stainless steel metal identical or compatible with that which constitutes the inside part of the bimetal pipes.

The relative dimensions of the threads and the lengths of the male elements are such that the ends of the male elements can come in contact and achieve the deformations that enable them to assure fluid tightness, according to the invention, before too great a binding occurs at the site of the threads.

However, according to the invention, it is preferable that the binding of one of the male elements in the sleeve be considerably greater than the binding of the other male element in the sleeve so as to assure, during assembly and disassembly of the joint, that the sleeve always remains positioned on the same male element. For this it suffices that the tightening torque of the sleeve on the male element which should not be separated from the sleeve have a value considerably greater than the value of the tightening torque of the other male element in the sleeve.

It is advantageous, according to the invention, to mount the sleeve at the plant on the male element from which it is not to be separated.

BRIEF DESCRIPTION OF THE DRAWINGS

There will now be described several embodiments of the invention that are shown in the accompanying drawings in which:

FIG. 1 is a view in axial section of a first embodiment of a joint according to the invention, after assembly;

FIG. 2 is a view in axial section of the joint of FIG. 1 being assembled;

DESCRIPTION OF PREFERRED EMBODIMENT

FIGS. 1 and 2 represent the joint according to the invention made between two male elements 1 and 2 by a sleeve 3. Conical outside threads 4 are provided at the ends of male elements 1 and 2 to work with corresponding threads 5 made on the inside surface of the sleeve. The threads are preferably trapezoidal threads disappearing at the outside surface of the pipes.

Figure 5:
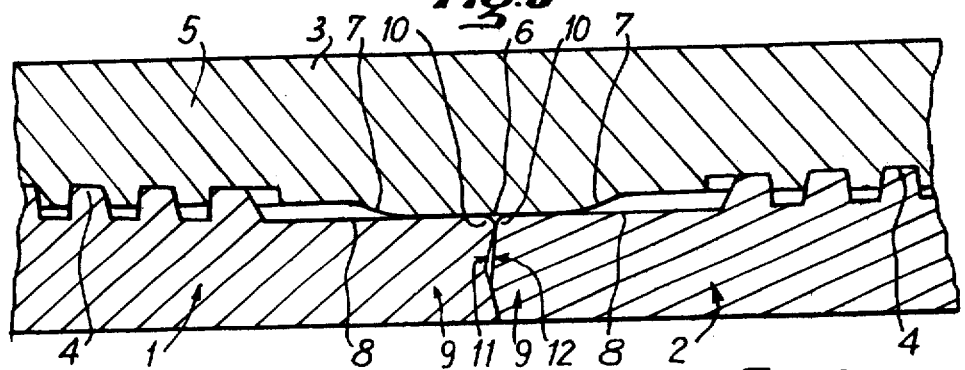
FIG. 5 is a half-view in axial section, on a larger scale, of the joint of FIGS. 1 and 2.

As shown on a larger scale in FIG. 5, sleeve 3 comprises in its central part a cylindrical fluid-tight female surface 6 connected on both sides with the inside surface of sleeve 3 by curved surfaces 7.

Male fluid-tight surfaces 8, also cylindrical, are provided on the outside of ends 9 of male elements 1 and 2. The diameter of the male fluid-tight surfaces 8 is also equal to or slightly larger than the diameter of female fluid-tight surface 6 of sleeve 3 so tht there is no play between the fluid-tight surface during engagement of male elements 1 and 2 in sleeve 3. However, the binding, which can result therefrom, should not be excessive to avoid any jamming.

Moreover, it will be noted that in the embodiment described, the peripheral edges 10 of male elements 1 and 2 have been slightly rounded off. The roundings have been exaggerated in the drawing for greater clarity. In practice, the roundings can be nonexistent or consist of any small bevel to break the sharp edge of the end of the male elements. In certain cases, these roundings can be quite large.

In the embodiment of FIGS. 1, 2 and 5, contact surfaces 11 and 12 of male elements 1 and 2 each consist of a first outside conical surface 16', 17' and a second inside conical surface 16, 17 whose conicity is oriented in the opposite direction.

By way of example, the angle of inclination a of surface 16' of element 1 is equal to 10°, while the angle of inclination b of surface 17' of element 2 is equal to 5°. In regard to the inside conical surfaces, angles of inclination c and d of conical surfaces 16 amd 17 of elements 1 and 2 can, for example, both be equal to 10°.

In the embodiment shown and for a reason that will be explained below, edges 14 and 15 formed by surfaces 16 and 16', on the one hand, and 17 and 17', on the other hand, are offset a distance h in the radial direction.

It can be seen, when the ends, thus constituted, of male elements 1 and 2 are brought together, the first contact is made on the outside periphery of surfaces 16' and 17'. As the axial pressure increases on the ends of the males elements, play 13 between surfaces 16, 16', and 17, 17' is reduced until surfaces 16 and 17 come in contact with one another to assure a limitation of screwing.

It is understood that radial offset h of edges 14 and 15 makes it possible to assure a clear screwing limitation by the contact of surfaces 16 and 17. In the embodiment described, offset h has a value of 1 mm and a thickness at the ends of the pipes of about 10 to 20 mm.

Assembly of the joint according to the invention is performed as follows:

As shown in FIG. 2, sleeve 3 is screwed first onto the end of one of the male elements, for example, male element 2. Optionally, it can be fastened thereto by gluing, for example.

This assembly advantageously can be performed at the plant, while assembly of the end of male element 1 in sleeve 3 (FIG. 1) is performed on site, with a tightening torque less than that of male element 2 if the latter is not tight on the sleeve.

Figure 6:
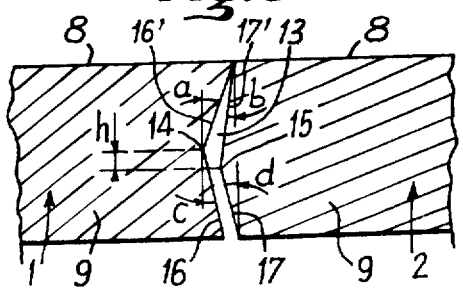
FIG. 6 diagrammatically represents the ends of the male elements of the joint of FIG. 5 at the time of their first contact.
Figure 7:
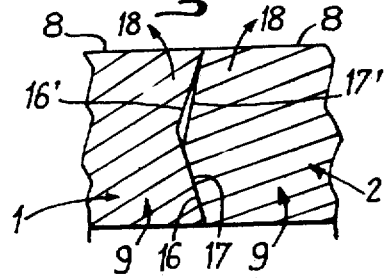
FIG. 7 corresponds to FIG. 6 after complete tightening of the joint.

It is understood that when male element 1 is assembled in sleeve 3, the first contact between the contact surfaces of the ends of male elements 1 and 2 is made at the outside periphery as shown in FIG. 6. When tightening is continued, a caulking occurs at this periphery hence male elements 1 and 2 continue to come together until inner inside contact surfaces 16 and 17 respectively come in contact as shown in FIG. 7. Offset h results in a stop phenomenon so that tightening cannot be continued.

During this tightening, the walls of ends 9 of male elements 1 and 2 have a tendency, by the kunckle joint effect, to move radially outward as shown by arrows 18. Consequently, male fluid-tight surfaces 8 are flattened on female fluid-tight surface 6 of sleeve 3 resulting in an improvement of fluid tightness.

Figure 3:
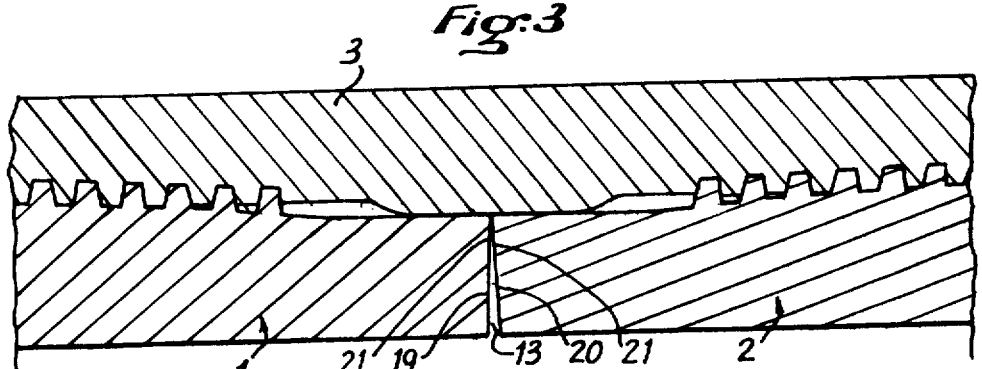
FIG. 3 is a half-view in axial section of a second embodiment of a joint according to the invention, before complete tightening.
Figure 4:
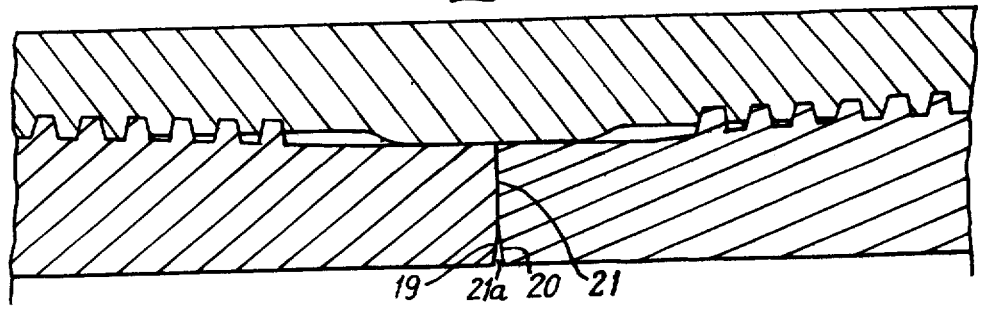
FIG. 4 is a half-view corresponding to FIG. 3, after complete tightening of the joint.

FIGS. 3 and 4 show another embodiment in which the first contact of male elements 1 and 2 is always provided at the outside periphery of these pipes. As above, space 13 enlarges from the outside periphery to the inside periphery of the male elements. However, in this case, contact surfaces 19 and 20 of the ends of male elements 1 and 2 are concave conical surfaces, i.e., conical surfaces whose summit is located on the axis of pipes 1 and 2 on the inside of these male elements.

As mentioned above, when male element 1 is screwed in sleeve 3, the first contact between the ends of male elements 1 and 2 is made at the outside periphery 21 of surfaces 19 and 20 (FIG. 3). When the assembly is performed there is a caulking in outside peripheral zone 21 of surfaces 19 and 20 (FIG. 4) so that surfaces 16 and 17 approach each other until they come in contact to form a stop like surfaces 16 and 17 of the preceding embodiment.

In the tightened position of the joint, caulking of the ends of the male elements, which is performed by elastic and possibly plastic deformation of the metal, brings the totality of surfaces 19 and 20 of the ends of the male elements in contact, or possibly leaves a slight play 21a which affects only a part of surfaces 19 and 20 as shown in FIG. 4, in an exaggerated way for clarity of the drawing.

It will be understood that the amount of play 21a depends on the inclination of surfaces 19 and 20 and the tightening of the joint. In most cases, it is preferable that this play be reduced to nothing or almost nothing but the existence of such play is compatible with the practice of the invention.

It will be possible, for example, to choose values on the order of 15 minutes to 30 minutes for the angles between the generatrices of the conical surfaces and the radial planes.

Figure 8:
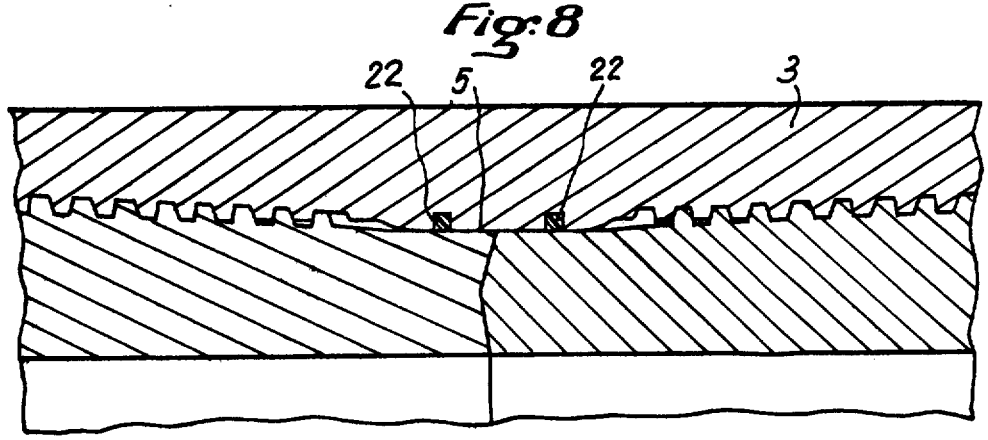
FIGS. 8, 9 and 10 are variants of the joint according to FIG. 1.

FIG. 8 represents a variant in which two fluid-type PTFE O rings 22 are housed in annular grooves provided on both sides of female fluid-tight surface 5 of sleeve 3.

Figure 9:
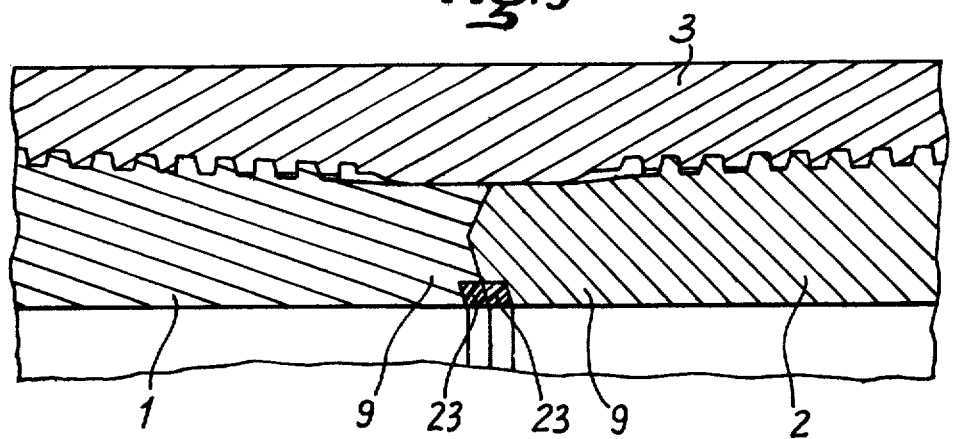

Another variant is shown in FIG. 9 in which PTFE rings 23 are housed in recesses provided for this purpose on the inside periphery of ends 9 of male elements 1 and 2.

In another embodiment there is provided only a single PTFE ring which is preferably placed at the end of male element 1.

In both these two variants, the presence of the PTFE makes it possible to obtain an additional fluid tightness.

Figure 10:
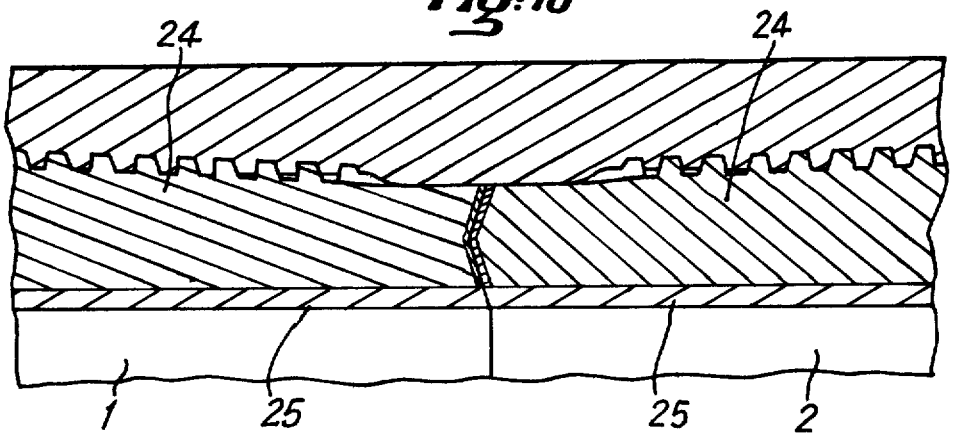

FIG. 10 represents an embodiment in which male elements 1 and 2 are bimetal pipes whose outside part 24 is made, for example, of regular steel, while inside part 25 is made, for example, of stainless steel.

Given the contact made between surfaces 16 and 17 (FIGS. 6 and 7) of male elements 1 and 2, it can be seen that the contact between the two stainless steel surfaces 25 of male elements 1 and 2 is fluid-tight. Consequently, the fluid circulating inside the joint cannot penetrate between surfaces 16 and 17 and cannot reach the zones of elements 1 and 2 made of regular steel.

In a preferred variant of this embodiment, the front ends 19 and 20 of the male elements are covered with a stainless metal identical or compatible with the one that constitutes inside part 25 of the male elements.

This invention was described with reference to the cylindrical fluid-tight surfaces both on the sleeve and on the ends of the male elements. Although this cylindrical shape for the fluid-tight surfaces is the preferred shape according to the invention, it would not be going outside the spirit of the invention to make the fluid-tight surfaces with very slight conical shapes which would not depart much from a cylindrical shape. In this hypothesis, it is clear that the male elements should have, at their end, a fluid-tight surface exhibiting a conicity in the same direction as the conicity of their threads.

Further, this invention has been described with reference to joints having conical threads.

It is understood, considering that the fluid tightness of the joint is obtained according to the invention by jamming of the fluid-tight surfaces in the vicinity of the point of contact of the ends of the male elements, the shape of the threads is not determining to the extent that the threads are intended essentially to exert convergent axial forces on the ends of the male elements. Thus, in certain cases and without going outside the spirit of the invention, it would be possible to use joints exhibiting cylindrical threads or combinations of cylindrical and truncated conical threads when this would be necessary to reduce the total thickness of the joint.

What is claimed is:

1. A pipe joint structure comprising: externally threaded male members and an internally threaded coupling sleeve, said coupling sleeve threadedly engaging said male members, said sleeve having a substantially cylindrical internal seal surface located between the threads thereon, each of said male members having a thread-free end portion with a substantially cylindrical external seal surface that before make-up has an outer diameter at least equal to the inner diameter of said internal seal surface on said sleeve and which engages said internal seal surface when said joint is made up, said male members having tip regions at the outer peripheries of their said end portions that provide first contact between said end portions as said joint is made up and then tend to move radially outward as said joint is tightened to provide fluid tight sealing engagement of said external seal surfaces with said internal seal surface, said end portions having surface means on the front faces thereof adjacent said tip regions that are shaped to provide a space that increases in size toward the center of said joint prior to make-up and decreases in size during make-up.

2. The pipe joint structure of claim 1 wherein said surface means comprises end surface areas at least one of which is concave conical.

3. The pipe joint structure of claim 1 wherein said surface means comprise surface areas that are each concave conical.

4. The pipe joint structure of claim 1 wherein said surface means comprises surface areas located near the inner peripheries of said end portions that are brought into abutting contact to provide a stop against further tightening of said joint.

5. The pipe joint structure of claim 1 wherein said surface means includes on each end portion an outer conical surface and an inner conical surface, the conicity of which is in the direction opposite to the conicity of said outer conical surface, the outer conical surface of one of said end portions being concave and having a greater conicity than the corresponding convex conical surface of the other end portion, said inner conical surface of each end portion coming into contact to provide a stop against further tightening of said joint.

6. The pipe joint structure of claim 1 wherein said internal seal surface on said sleeve is joined at each end to the threaded areas thereof by guide surfaces having progressively increasing diameters.

7. The pipe joint structure of claim 1 wherein the outer edge of each tip region is slightly rounded.

8. The pipe joint structure of claim 1 further including seal means between each of said end portions and said internal surface.

9. The pipe joint structure of claim 1 further including seal means between opposed end surfaces of said end portions.

10. The pipe joint structure of claim 1 wherein said male members are formed of inner and outer pipes, said inner pipe being made of stainless steel.

11. The pipe joint structure of claim 10 wherein said surface means are made by a stainless metal that is compatible with the metal with which said inner pipe is made.

* * * * *